(No Model.)
O. E. JENSEN.
HAY SLING.
No. 574,997.  Patented Jan. 12, 1897.
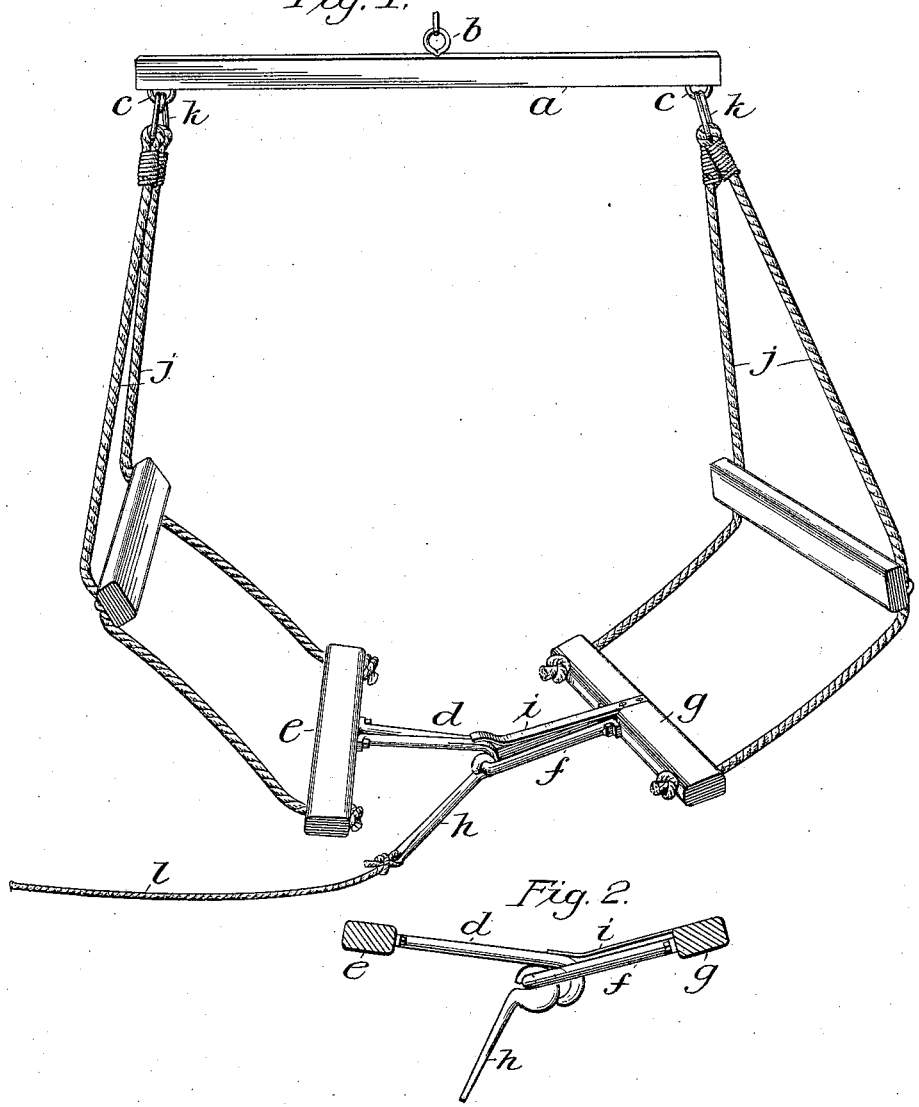
Witnesses.
Lars Peter Larsen
Edward E Petersen
Inventor.
O. E. Jensen

UNITED STATES PATENT OFFICE.

OLE E. JENSEN, OF CLARK'S GROVE, MINNESOTA.

HAY-SLING.

SPECIFICATION forming part of Letters Patent No. 574,997, dated January 12, 1897.

Application filed April 20, 1896. Serial No. 588,411. (No model.)

*To all whom it may concern:*

Be it known that I, OLE E. JENSEN, a citizen of the United States, residing at Clark's Grove, in the county of Freeborn and State of Minnesota, have made a new and useful Improvement in Hay-Slings, (before patented in Patent No. 502,721, issued to Lewis J. Helland, dated August 8, 1893,) of which the following is a specification.

The improvement consists of four ropes, held apart by four slats, (connected by a trip attachment,) to be placed across the front half of the back and the same across the hind half before the load is loaded. When the load is on, the ropes on either end are hitched to a beam suspended from the carrier and the load is lifted.

Figure 1 is a perspective view of the sling. Fig. 2 is a detail view.

The beam $a$ is provided with a clevis $b$ over the center, to which the carrier-hook is hitched. The eyebolts $c$ are secured to the ends of the beam. The trip attachment consists of a hook $d$, bolted to the center of the slat $e$, and a link $f$, bolted to the opposite slat $g$. On the opposite end of same link $f$ is a lever $h$, by which the hook is detached from the link $f$, a steel spring $i$, fastened to slat $g$, projecting over the link $f$, and the hook $d$ holding the hook $d$ in place till detached by lever $h$. At the opposite ends of ropes $j$ are hooks $k$, adapted to be hitched to eyebolts $c$. The tripping is done by a rope $l$ from lever $h$ to where the operator stands.

I claim—

A hay-sling comprising suspending-ropes, means for supporting said ropes, slats attached to said ropes, a hook attached to the slat at the free ends of one pair of ropes, a link attached to the slat at the free end of the other pair of ropes, a spring secured to said slat and bearing upon the hook when in engagement with the link, and means for releasing said hook.

OLE E. JENSEN.

Witnesses:
LARS PETER LARSEN,
EDWARD E. PETERSEN.